(12) United States Patent
Nakaike et al.

(10) Patent No.: US 7,712,079 B2
(45) Date of Patent: May 4, 2010

(54) PROGRAM EDITING APPARATUS, PROGRAM EDITING METHOD, AND PROGRAM FOR SPLITTING A PROGRAM FILE

(75) Inventors: Takuya Nakaike, Yamato (JP); Goh Kondoh, Tokyo (JP); Fumihiko Kitayama, Sagamihara (JP); Shinichi Hirose, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 10/739,818

(22) Filed: Dec. 18, 2003

(65) Prior Publication Data

US 2005/0086631 A1    Apr. 21, 2005

(30) Foreign Application Priority Data

Dec. 27, 2002  (JP) .............................. 2002-380356

(51) Int. Cl.
  G06F 9/44    (2006.01)
(52) U.S. Cl. ...................................... 717/113; 717/110
(58) Field of Classification Search .......... 717/110–113
  See application file for complete search history.

(56) References Cited

U.S. PATENT DOCUMENTS

| 5,161,216 A * | 11/1992 | Reps et al. | 717/151 |
| 6,301,700 B1 * | 10/2001 | Choi et al. | 717/116 |
| 2004/0226006 A1 * | 11/2004 | Russell | 717/154 |

FOREIGN PATENT DOCUMENTS

| JP | 07-036680 | 2/1995 |
| JP | 11-237984 | 8/1999 |

OTHER PUBLICATIONS

Weiser, Mark, "Program Slicing," 1981, IEEE, p. 439-449.*
Agrawal et al., "Dynamic Program Slicing," 1990, ACM, p. 246-256.*
Gerber et al., "Slicing Real-Time Programs for Enhanced Schedulability," 1997, ACM, p. 525-555.*
Krintz et al., "Reducing Transfer Delay Using Java Class File Splitting and Prefetching," 1999, ACM, p. 276-291.*

(Continued)

*Primary Examiner*—Wei Y Zhen
*Assistant Examiner*—Qing Chen
(74) *Attorney, Agent, or Firm*—Scully, Scott, Murphy & Presser, P.C.; Kenneth R. Corsello, Esq.

(57) ABSTRACT

A program editing apparatus includes a user interface control unit, a JSP analysis unit, and a split execution unit. The user interface control unit accepts an input of a split object instruction which specifies a portion to be split off from a JSP file to be processed. The JSP analysis unit determines an accompanying split portion which is split off together with the portion specified by the split object instruction. The split execution unit splits off the portion specified by the split object instruction and the accompanying split portion from the original JSP file. The JSP analysis unit analyzes dependence of variables and objects in the JSP file and splits off a copyable portion by copying. Thus, a program file after split is ensured to operate the same as the program file to be processed.

21 Claims, 13 Drawing Sheets

OTHER PUBLICATIONS

Tip et al., "A Slicing-Based Approach for Locating Type Errors," 2001, ACM, p. 5-55.*

Chen et al., "Slicing Object-Oriented Java Programs," 2001, ACM, p. 33-40.*

Chen et al., "Slicing Concurrent Java Programs," 2001, ACM, p. 41-47.*

Ricca et al., "Construction of the System Dependence Graph for Web Application Slicing," 2002, IEEE.*

Childs et al., "VBScript in a Nutshell," May 2000, O'Reilly.*

Weiser, Mark. "Program Slicing," IEEE Transactions on Software Engineering, vol. Se-10, No. 4, Jul. 1984, pp. 352-357.

Maruyama, "Automated Method-Extraction Refactoring by Using Block-Based Slicing" SSR'01 May 18-20, 2001, Toronto, Ontario, Canada.Copyright 2001 ACM.

Ricca et al. "Web Application Slicing" ICSM, p. 148, 17th IEEE International Conference on Software Maintenance (ICSM'01), 2001.

* cited by examiner

FIG. 3

```
         ⋮
5:      JspWriter out = pageContext.getOut();
6:      out.write("<html><body bgcolor=blue>");
         ⋮
10:     out.write("<table><tbody><tr><td>");
         ⋮
```

FIG. 4

| VARIABLE NAME | CLASS NAME |
|---|---|
| _jspxFactory | javax.servlet.jsp.JspFactory |
| pageContext | javax.servlet.jsp.PageContext |
| session | javax.servlet.http.HttpSession |
| application | javax.servlet.ServletContext |
| config | javax.servlet.ServletConfig |
| out | javax.servlet.jsp.JspWriter |

FIG. 9

```
<TABLE>
<TBODY>
<jsp:useBean id="thinkPadDB" class="database.ThinkPadDB" scope="page"/>
<jsp:setProperty name="thinkPadDB" property="database" value="<%=new ThinkPadDataBase()%>"/>
<logic:iterate name="thinkPadDB" property="ids" id="thinkPadId" type="java.lang.String">
<jsp:setProperty name="thinkPadDB" property="id" value="<%=thinkPadId%>"/>
<bean:define id="thinkPad" name="thinkPadDB" property="thinkPad" type="database.ThinkPad"/>
<TR>
<TD><FONT size=".1"><a href="<%=request.getContextPath()%>?thinkPadId=<%=thinkPadId%>">
<jsp:getProperty name="thinkPad" property="name"/></A></FONT></TD></TR>
</logic:iterate>
</TBODY>
</TABLE>

...

<TABLE>
<TBODY>
<logic:iterate name="thinkPadDB" property="ids" id="thinkPadId" type="java.lang.String">
<jsp:setProperty name="thinkPadDB" property="id" value="<%=thinkPadId%>"/>
<bean:define id="thinkPad" name="thinkPadDB" property="thinkPad" type="database.ThinkPad"/>
<TR valign="top">
<TD><IMG src="<jsp:getProperty name="thinkPad" property="image"/>" width="140" height="140" border="0"></TD>
<TD valign="middle" align="left" width="292"><A href="<%=request.getContextPath()%>?thinkPadId=<%=thinkPadId%>"></A>
from <jsp:getProperty name="thinkPad" property="price"/> IBM Web Price "<BR>
<B><jsp:getProperty name="thinkPad" property="comment"/></B>
<UL>
<logic:iterate name="thinkPad" property="descriptions" id="description" type="java.lang.String">
<LI><FONT size=".1"><%=description%></FONT></LI>
</logic:iterate></UL></TD></TR>
</logic:iterate>
</TBODY>
</TABLE>
```

FIG. 11

```
<TABLE>
<TBODY>
    <jsp:useBean id="thinkPadDB" class="database.ThinkPadDB" scope="page"/>
    <jsp:setProperty name="thinkPadDB" property="database" value="<%=new ThinkPadDataBase()%>"/>
    <logic:iterate name="thinkPadDB" property="ids" id="thinkPadId" type="java.lang.String">
        <jsp:setProperty name="thinkPadDB" property="id" value="<%=thinkPadId%>"/>
        <bean:define id="thinkPad" name="thinkPadDB" property="thinkPad" type="database.ThinkPad"/>
        <TR>
        <TD><FONT size="-1"><a href="<%=request.getContextPath()%>?thinkPadId=<%=thinkPadId%>">
        <jsp:getProperty name="thinkPad" property="name"/></A></FONT></TD></TR>
    </logic:iterate>
</TBODY>
</TABLE>
```

```
<TABLE>
<TBODY>
    <jsp:useBean id="thinkPadDB" class="database.ThinkPadDB" scope="page"/>
    <jsp:setProperty name="thinkPadDB" property="database" value="<%=new ThinkPadDataBase()%>"/>
    <logic:iterate name="thinkPadDB" property="ids" id="thinkPadId" type="java.lang.String">
    <jsp:setProperty name="thinkPadDB" property="id" value="<%=thinkPadId%>"/>
    <bean:define id="thinkPad" name="thinkPadDB" property="thinkPad" type="database.ThinkPad"/>
    <TR>
    <TD><FONT size="-1"><a href="<%=request.getContextPath()%>?thinkPadId=<%=thinkPadId%>">
    <jsp:getProperty name="thinkPad" property="name"/></A></FONT></TD></TR>
    </logic:iterate>
</TBODY>
</TABLE>

...

<TABLE>
<TBODY>
    <logic:iterate name="thinkPadDB" property="ids" id="thinkPadId" type="java.lang.String">
    <jsp:setProperty name="thinkPadDB" property="id" value="<%=thinkPadId%>"/>
    <bean:define id="thinkPad" name="thinkPadDB" property="thinkPad" type="database.ThinkPad"/>
    <TR valign="top">
    <TD><IMG src="<jsp:getProperty name="thinkPad" property="image"/>" width="140" height="140" border="0"/></TD>
    <TD valign="middle" align="left" width="292"><A href="<%=request.getContextPath()%>?thinkPadId=<%=thinkPadId%>"></A>
    from <jsp:getProperty name="thinkPad" property="price"/> IBM Web Price "<BR>
    <B><jsp:getProperty name="thinkPad" property="comment"/></B>
    <UL>
    <logic:iterate name="thinkPad" property="descriptions" id="description" type="java.lang.String">
    <LI><FONT size="-1"><%=description%></FONT></LI>
    </logic:iterate></UL></TD></TR>
    </logic:iterate>
</TBODY>
</TABLE>
```

(A) main.jsp

```
<TABLE>
<TBODY>
<jsp:useBean id="thinkPadDB" class="database.ThinkPadDB" scope="page"/>
<jsp:setProperty name="thinkPadDB" property="database" value="<%=new ThinkPadDataBase()%>"/>
<logic:iterate name="thinkPadDB" property="ids" id="thinkPadId" type="java.lang.String">
<jsp:setProperty name="thinkPadDB" property="id" value="<%=thinkPadId%>"/>
<bean:define id="thinkPad" name="thinkPadDB" property="thinkPad" type="database.ThinkPad"/>
<TR>
<TD><FONT size="-1"><a href="<%=request.getContextPath()%>?thinkPadId=<%=thinkPadId%>"
<jsp:getProperty name="thinkPad" property="name"/></A></FONT></TD></TR>
</logic:iterate>
</TBODY>
</TABLE>
...
<TABLE>
<TBODY>
<jsp:include src="split1.jsp"/>
</TBODY>
</TABLE>
```

(B) split1.jsp

```
<jsp:useBean id="thinkPadDB" class="database.ThinkPadDB" scope="page"/>
<jsp:setProperty name="thinkPadDB" property="database" value="<%=new ThinkPadDataBase()%>"/>
<logic:iterate name="thinkPadDB" property="ids" id="thinkPadId" type="java.lang.String">
<jsp:setProperty name="thinkPadDB" property="id" value="<%=thinkPadId%>"/>
<bean:define id="thinkPad" name="thinkPadDB" property="thinkPad" type="database.ThinkPad"/>
<TR valign="top">
<TD><IMG src="<jsp:getProperty name="thinkPad" property="image"/>" width="140" height="140" border="0"</TD>
<TD valign="middle" align="left" width="282"><A href="<%=request.getContextPath()%>?thinkPadId=<%=thinkPadId%>"></A>
from <jsp:getProperty name="thinkPad" property="price"/> IBM Web Price <BR>
<B><jsp:getProperty name="thinkPad" property="comment"/></B>
<UL>
<logic:iterate name="thinkPad" property="descriptions" id="description" type="java.lang.String">
<LI><FONT size="-1"><%=description%></FONT></LI>
</logic:iterate></UL></TD></TR>
</logic:iterate>
```

FIG.14 from $1,599.00 IBM Web Price *
Wide range desktop alternatives

- For occasionally mobile users who need the flexibility to take work with them
- NEW mobile workstation models with Mobile IntelR PentiumR 4 Processor-M and ATIR graphics
- Travel weight starting at 6.6 lb up to a 15" TFT display
- Two removable drive bays from $2,299.00 IBM Web Price *

FIG. 15

```
<TABLE>
<TBODY>
<jsp:useBean id="thinkPadDB" class="database.ThinkPadDB" scope="page"/>
<jsp:setProperty name="thinkPadDB" property="database" value="<%=new ThinkPadDataBase()%>"/>
<logic:iterate name="thinkPadDB" property="ids" id="thinkPadId" type="java.lang.String"/>
<jsp:setProperty name="thinkPadDB" property="id" value="<%=thinkPadId%>"/>
<bean:define id="thinkPad" name="thinkPadDB" property="thinkPad" type="database.ThinkPad"/>
<TR>
<TD><FONT size=".1"><a href="<%=request.getContextPath()%>?thinkPadId=<%=thinkPadId%>">
<jsp:getProperty name="thinkPad" property="name"/></A></FONT></TD></TR>
</logic:iterate>
</TBODY>
</TABLE>
```

1502
1501
1503

PROGRAM EDITING APPARATUS, PROGRAM EDITING METHOD, AND PROGRAM FOR SPLITTING A PROGRAM FILE

FIELD OF INVENTION

The present invention relates to a technology which supports editing of a program using a computer, and specifically, relates to a method realizing an automatic split of a program.

BACKGROUND OF THE INVENTION

Under an environment where a World Wide Web (hereinafter, referred to as a web) technology utilized in the Internet and the like is used, various services can be provided as functions of web pages by transmitting HTML files (web pages) from a web server (hereinafter, simply referred to as a server) to a web client (hereinafter, simply referred to as a client). Today, for the purposes such as to meticulously meet the demands of individual users, the web pages are dynamically created in the server in accordance with access conditions from the client (user, temporal conditions, and the like).

As mechanisms of dynamically creating the web pages, there are Java Sever Pages (JSP) utilized under an execution environment of Java (trademark of Sun Microsystems, Inc., US), Active Server Pages (ASP) utilized in Internet Information Service (IIS, trademark of Microsoft Corporation, US), and the like. These mechanisms are application logics which can mixedly describe text data, scripts on a server side, and accesses to objects encapsulating logics and are converted into execution programs of the server side. In the server, each of the mechanisms implements processing that a script is executed in response to a request from the client and a portion of the script is replaced with an execution result, which is then returned to the client.

Meanwhile, the mechanism of dynamically creating the web pages can be efficiently utilized by splitting the above-described application logic. Details thereof will be provided below.

In the web page dynamically created in the server, some portions are frequently changed, and some portions are changed less frequency. When the created web page is cached, the cached web page becomes invalid in accordance with the portion changed with high frequency. Therefore, a cache effect is lowered. To overcome this, it is considered that the application logic is split in accordance with the frequency of the changes in each portion and fragments of the web page created by the individual split application logics are separately cached. Thus, even if there is a frequently changed portion, the changes therein can be handled by updating only the fragments of the frequently changed portion. Accordingly, it is unnecessary to make the cache of the entire web page invalid, thereby achieving the higher cache efficiency.

Moreover, in servers having function to perform the operation of web page creation on the plurality of servers and to improve an execution performance by load sharing, when the application logic is appropriately split and executed, load can be reduced and the operation can be efficiently performed.

Furthermore, when shareable portions are extracted from the application logic and used in another application logic, the application logics can be efficiently developed.

In order to obtain the foregoing effects, the application logic has been manually split by developers of the application logic or the like. Moreover, there are some existing technologies available for splitting the application logic such as program slicing (see non-patent literature 1, for example), web application slicing (see non-patent literature 2, for example), and method extraction (see non-patent literature 3, for example).

(Non-patent Literature 1)
Mark Weiser "Program Slicing" IEEE Trans. Software Engineering, July 1984 p. 352-357.
(Non-patent Literature 2)
F. Ricca and P. Tonella "Web Application Slicing" In Proceedings of IEEE International Conference on Software Maintenance 2001.
(Non-patent Literature 3)
K. Maruyama "Automated Method-Extraction Refactoring by Using Block-Based Slicing" In Proceedings of the 2001 symposium on Software reusability.

As previously described, the mechanism of creating the web page can be efficiently utilized by splitting the application logic, such as JSP or ASP, for dynamically creating the web page. However, the split operation of the application logic has been manually performed by the developers of the application logic or the like, thus requiring a lot of labor.

Some existing tools are available for the split operation of the application logic, but inadequate for splitting the application logic by only mechanical operations.

For example, in the technology called program slicing, sentences that affect a predetermined sentence in a program are detected based on data dependence and control dependence within the program, and a program slice (partial program) is mechanically created. This technology analyzes the data dependence and the control dependence and obtains a set of sentences, each including the dependence, as a program slice. This technology is very useful for debugging or operating the program.

However, only the program slice created by the program slicing can be correctly executed, but it is not taken into consideration of correctly executing a portion remaining after the program slice is cut away. Accordingly, when the program slicing is applied to split off the aforementioned application logic such as JSP, a fragment remaining after a predetermined fragment is cut away from the original web page may not be executed as it is. The remaining fragment therefore needs to be manually checked and modified.

The technology called web application slicing analyzes dependence amongst a plurality of pages containing text data and scripts of the server side in a web application and extracts scripts related to a predetermined portion. This technology has the same problem as the program slicing has, although the technology analyzes the transitions among web pages in addition to the data and the control dependencies.

Similarly to the program slicing, this technology was not made under the assumption that the split web applications are separately executed and results thereof are merged. Accordingly, the application logic such as JSP cannot be automatically split into a properly executable form, thus requiring manual modification.

In the technology called method extraction, a predetermined portion in a program is extracted as a method, and reusability is increased.

However, in method calling of a normal program, arguments in arbitrary data types can be passed, and return values in arbitrary data types can be returned. Therefore, data dependence may exist between a portion which is extracted and cut away and a remaining portion. On the contrary, in the case of splitting the application logic such as JSP, it is not allowed to pass the arguments in arbitrary data types. Accordingly, this method extraction cannot be applied to the split of the application logic as its own. As a countermeasure, a technique is considered that an argument is once converted into a character string and the converted argument is inversely converted back to the original data by a receiver. However, this technique involves significant execution overhead and therefore it is not realistic.

SUMMARY OF THE INVENTION

Considering the foregoing, it is an aspect of the present invention to provide a technique of automatically and properly splitting an application logic which realizes a mechanism of dynamically creating a web page in a server.

The present invention for achieving the above-described aspect is realized as a program editing apparatus for editing a program file to be processed, and is constituted as follows. Specifically, this program editing apparatus includes: file storing unit storing a program file of an application logic as a processing object; a user interface control unit accepting an input of a split object instruction which specifies a portion to be split off from the program file to be processed; an analysis unit determining an accompanying split portion which is split off together with the portion specified in the split object instruction; and a split execution unit splitting, from the original program file, the portion specified in the split object instruction and the accompanying split portion determined by the analysis unit. Herein, the application logic can mixedly describe text data, a server side script, and an access to an object encapsulating a logic. Moreover, the application logic is converted into an execution program on the server side. The accompanying split portion is determined by the analysis of the analysis unit and split off together with the portion specified in the split object instruction. Accordingly, it is ensured that program files after split performs the same action as that of the program file to be processed.

As a splitting method, the analysis unit classifies a portion to be copied from the program file before the split to a new program file created by the split and a portion to be cut away from the program file before the split and moved to the new program file. More specifically, a certain portion of the program file is copied to the new program file when the certain portion has no side effects on the entire processing action by each of the program files after the split, even after the certain portion is copied to the new program file made by the split. The certain portion of the program file is also copied to the new program file when it is required to cut away a portion other than the certain portion due to that only the certain portion was cut away from the original program file. In other words, a certain portion of the program file is copied to the new program file when it is meaningless if the certain portion is cut away and moved to the new program file. In this-way, the split by copying the copyable portions can ensure normal actions of the program files after the split, and also minimize the portions to be split by moving.

Further particularly, the analysis unit analyzes data dependence related to the access to the object encapsulating the logic, based on a functional feature of the application logic regardless of an execution environment of the program file. During the analysis, a plurality of portions, having dependence related to data obtained from the execution environment of the program file, are judged to be splittable by the analysis unit.

Another program editing apparatus according to the present invention includes: display means for displaying a Java Server Pages (JSP) file to be processed; accepting means for accepting a split object instruction made by specifying a certain portion to be split off for the JSP file displayed by the display means; split object determining means for determining a portion to be split off together with the portion specified by the split object instruction based on the split object instruction made for the JSP file to be processed; and display control means for causing the display means to display the portion to be split off, which is determined by the split object determining means, in a distinct manner.

Another embodiment of the present invention for achieving the foregoing aspect is realized as a program editing method described below, in which a program file of a processing object is split by the use of a computer. Specifically, the program editing method includes the steps of: reading a program file to be processed from a predetermined storage device which stores program files of an application logic, in which the application logic is allowed to mixedly describe text data, a server side script, and an access to an object encapsulating a logic and converted into an execution program on a server side; accepting an input of a split object instruction which specifies a portion to be split off from the read program file to be processed; determining an accompanying split portion which is split off together with the portion specified by the split object instruction; and splitting the portion specified by the split object instruction and the accompanying split portion from the original program file.

Furthermore, the present invention is realized as a program which controls a computer to function as the above-described program editing method or as a program causing the computer to execute processes corresponding to the respective steps in the above-described program editing method. This program can be provided by being distributed after stored in a recording medium such as a magnetic disk, an optical disk, and a semiconductor memory, or delivered through a network.

BRIEF DESCRIPTION OF THE DRAWINGS

For a more complete understanding of the present invention and the advantages thereof, reference is now made to the following description taken in conjunction with the accompanying drawings.

FIG. 3 is a view showing an example of a portion of a servlet program which outputs a text data of a web page.

FIG. 4 is a table showing a list of variables which are used in the embodiment and can be referred commonly from each JSP file even after split.

FIG. 9 is a view showing an example of the JSP file.

FIG. 11 is a view showing the JSP file in a case where a split object instruction is made for the JSP file of FIG. 9.

FIG. 12 is a view showing the JSP file in a case where another split object instruction is made for the JSP file of FIG. 9.

FIGS. 13A and 13B are views showing actual split of the JSP file based on the split object instruction made as FIG. 12.

FIG. 14 is a view showing an example of a web page created when a JSP file split1.jsp is independently executed.

FIG. 15 is a view showing the JSP file in a case where another split object instruction is made for the JSP file main.jsp of FIG. 13.

DETAILED DESCRIPTION OF THE PREFERRED EMBODIMENT

Hereinafter, the present invention will be detailed based on an embodiment shown in the accompanying drawings.

The present invention is applicable to general application logics which implement a mechanism for dynamically creating web page in order to automatically split-off the application logic in a web-based server that functions on a network such as the Internet. However, the embodiment will be described taking a case of implementing the mechanism by JSP as an example.

Figure 1:
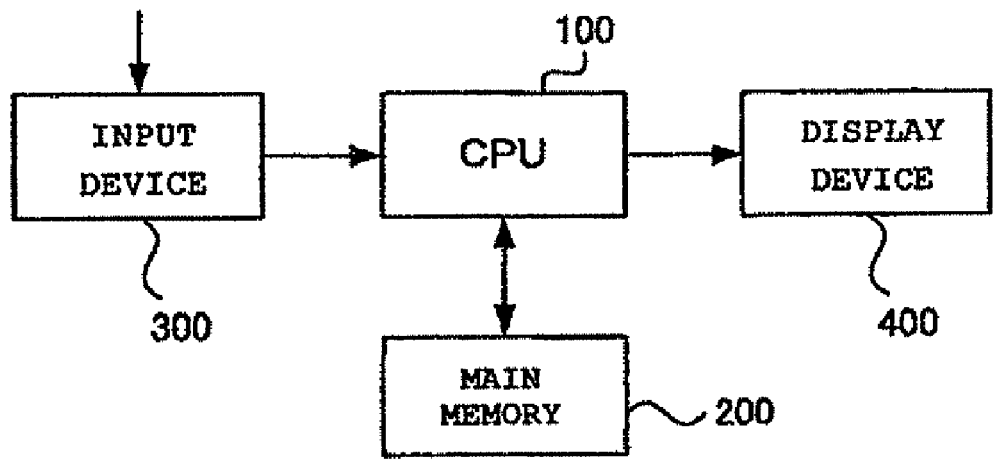
FIG. 1 is a diagram showing an configuration example of computer device which implements a data processing method according to an embodiment.

FIG. 1 is a diagram showing a configuration example of computer device implementing a data processing method according to the embodiment.

The computer device shown in FIG. 1 includes a CPU 100, a main memory 200, an input device 300, and a display device 400. The CPU 100 performs various types of data processing by program control. The main memory 200 stores a program for controlling the processing by the CPU 100 as well as data processed by the CPU 100. The input device 300 inputs various commands and data. The display device 400 displays the processing results by the CPU 100.

Figure 2:
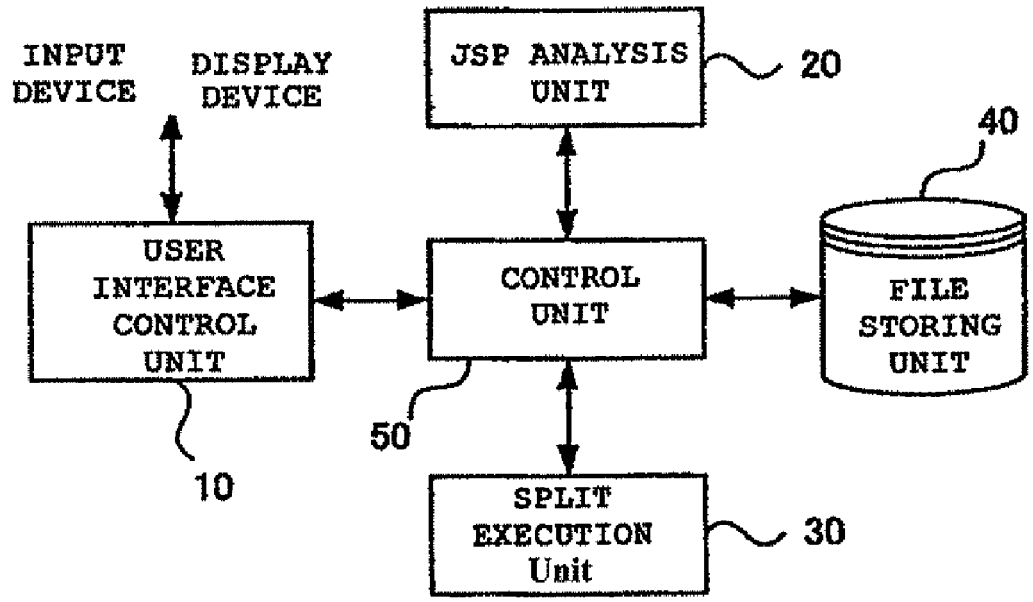
FIG. 2 is a diagram showing a functional configuration of a data processing system performing split processing of a JSP file according to the embodiment.

FIG. 2 shows a functional configuration of a data processing system which performs split processing of JSP (application logic) according to the embodiment in the computer device shown in FIG. 1.

Referring to FIG. 2, the data processing system according to the embodiment includes a user interface control unit 10, a JSP analysis unit 20, a split execution unit 30, a file storing unit 40, and a control unit 50. The user interface control unit 10 accepts an input of a command by a user. The JSP analysis unit 20 and the split execution unit 30 execute split of a JSP file based on a split object instruction accepted through the user interface control unit 10. The file storing unit 40 stores the JSP file to be processed. The control unit 50 controls actions of the entire system.

In the above configuration, the user interface control unit 10, the split execution unit 30, the JSP analysis unit 20, and the control unit 50 are virtual software blocks implemented by, for example, the program-controlled CPU 100 in the computer device shown in FIG. 1. The program which controls the CPU 100 is provided by being distributed after stored in a recording medium such as a magnetic disk, an optical disk, and a semiconductor memory, or delivered through a network. In the configuration shown in FIG. 1, this program is read in the main memory 200 to control the CPU 100. The file storing unit 40 is implemented in the main memory 200. As a matter of course, the above-described program and the JSP file stored in the main memory 200 are properly saved in a magnetic disk or other external storage as appropriate.

The user interface control unit 10 in the embodiment has a function as accepting means which causes the display device 400 to display the JSP file to be processed, accepts the split object instruction and a split execution command associated with the JSP file, and passes the same to the JSP analysis unit 20. The split object instruction and the split execution command are inputted by the user by the use of the input device 300 such as a keyboard and a mouse. The user interface control unit 10 also has a function as display control means which causes the display device 400 to display the JSP file in which portions that will be split-off, determined by analysis of the JSP analysis unit 20, are distinctly shown, and the JSP file which is split off after being processed by the split execution unit 30. The split object instruction is made by specifying an operation (port-ion of the JSP file) that the user wants to split among operations described in the JSP file. The operations will be later described with a concrete example.

The JSP analysis unit 20 analyzes dependence in the JSP file to be processed. The JSP analysis unit 20 also has a function as split object determining means which, in accordance with the split object instruction inputted through the user interface control unit 10, determines operations (portions of the JSP file, accompanying split portions) which should be split off together with the operation specified in the split object instruction. Herein, the analysis by the JSP analysis unit 20 is performed by utilizing the JSP specification, i.e., a functional feature of this type of application logic describing scripts within a text file. The processing of the JSP analysis unit 20 will be later described in detail.

The split execution unit 30 executes split of the JSP file to be processed based on the split execution command inputted through the user interface control unit 10 in accordance with a result of the analysis by the JSP analysis unit 20. The split of the JSP file is performed in such a manner that a portion cut away from an original JSP file is retained as another new JSP file, which is then imported by a tag <jsp:include . . . /> of the original JSP file (remaining JSP file after the cutting away). When the original JSP file is executed, the JSP file specified by the tag <jsp:include . . . /> is called and executed as a different servlet. A result of the execution is returned to the original JSP file and merged with an execution result of the original JSP file to create a web page.

The file storing unit 40 stores the JSP file which is an object of the split-off processing according to the embodiment and the JSP file split according to the embodiment. Practically, the file storing unit 40 may be the same as storage means of a server, which stores JSP files used by the server for automatically creating web pages. In this case, the JSP file selected as the object of the split-off processing from the JSP files stored in the storage means is properly read out, split and returned.

The control unit 50 controls an action by each of the above-described functions and controls input and output of the JSP files in the file storing unit 40. For example, the control unit 50 reads out the JSP file from the file storing unit 40 and passes the JSP file to the user interface control unit 10 or the split execution unit 30 for each processing. Moreover, the control unit 50 stores the JSP files split by the split execution unit 30 into the file storing unit 40. The functions of the control unit 50 can be provided as functions of an operating system (UNIX™, WINDOWS™ by Microsoft Corporation, or the like) installed in the computer device, which implements the data processing system of the embodiment.

Next, the split processing of JSP files according to the embodiment will be detailed.

In the case of splitting the JSP file, it should be ensured that the JSP files after the split as a whole perform the same action as the JSP file before the split. Therefore, in addition to the operation in the JSP file specified by the split object instruction from the user, another operation depending on the specified operation and still another operation that the specified operation depends on are required to be split, in order to normally perform actions including the split operations so as to constitute the same actions as those before the split.

The JSP file is converted into a servlet program in execution. Accordingly, if the JSP file is split such that data dependence and control dependence within the program are not broken, the split JSP files can perform the same action as that before the split-off. Therefore, the data dependence and control dependence within the servlet program obtained from the JSP file are analyzed and the JSP file is split while judging that the portion including the data dependence or the control dependence can not be split. Consequently, it is considered that the program after the split can be ensured to perform the same action as that before the split.

However, to analyze the data and control dependence within the servlet program, a specification of a runtime engine (servlet engine) executing the servlet program and the like should be taken into account, which requires a lot of labor and it is thus unrealistic.

If the portions containing the data dependence or the control dependence are simply judged to be unsplittable, some portions which are splittable as the JSP files based on the JSP specification are judged to be unsplittable for the following two reasons.

1. Consideration is not Given to Variables that are Usable after Split in the same way as before Split.

Considering that the servlet program converted from the JSP file is split off, some variables are usable after split in the same way as before the split. These variables are data obtained from an execution environment on the server. For example, in a certain servlet program, a variable for I/O which is used as an output destination of text data of a web page is usable in the same way from the split servlet programs.

FIG. 3 is a view showing an example of a portion of the servlet program outputting the text data of the web page.

In the program shown in FIG. 3, when trying to split off a sentence 10 without breaking data dependence, sentences 5, 6 and 10 are judged to be unsplittable because of data dependence related to a variable out. However, the variable out is usable from all the split servlet programs, and thus there is no problem even if these sentences are actually split off.

2. Consideration is not Given to Scope of JavaBeans™ and an Execution Condition after Split are not Taken into Account. JavaBeans is a Trademark of Sun MicroSystems, Inc.

When data retention is performed within the JSP file, objects (program components) which implement functions of JSP, called JavaBeans, are frequently used. The JavaBeans, as specifically shown below, are operable by using the following tag languages in the JSP file.

tag <jsp:useBean>: a Bean is declared with a name. The object of the Bean is created if not present. The Bean is defined as a Java class.

tag <jsp:setProperty>: a value is defined for the JavaBeans object. Actually, a setter method (set property name) of the object is called.

tag <jsp:getProperty>: a value is gotten from the Java-Beans object. Actually, a getter method (get property name) of the object is called.

When the Bean is declared in the tag <jsp:useBean>, a scope indicating the life cycle thereof can be explicitly specified. Four types of scopes that can be given to the Beans are shown in the following.

(1) Application scope: the Bean lives within one servlet container (servlet container operating on a virtual machine (Java Virtual Machine)).

(2) Session scope: the Bean lives for one session.

(3) Request scope: the Bean lives for one request.

(4) Page scope: the Bean lives within one JSP page.

A relationship between retention and acquisition of data in the JavaBeans is the same as a relationship between definition and use of a variable. The JSP file includes data dependence related to the JavaBeans, in other words, data dependence related to accesses to objects encapsulating logics. Meanwhile, before data retention or acquisition for a Bean, it is necessary to declare the Bean and create an object thereof as needed.

In the case of intending to split the JSP file without breaking the data dependence, if this type of data dependence related to the JavaBeans is included, the JSP file is judged that the split thereof is impossible. However, considering the scope given to the Bean and the execution condition after the split, the split is possible in some cases even if the data dependence related to the JavaBeans is included. For example, in the case of the Bean in the application scope, if the JSP files after the split are executed on one servlet container, the Bean lives throughout all of the split JSP files. Accordingly, the split JSP files can properly operate.

In the embodiment, to cope with the above-described matters, the dependence related to the JavaBeans in the JSP file to be processed is analyzed by the JSP analysis unit 20 prior to the split processing of the JSP files by the split execution unit 30. Based on a result of this analysis, operations that can be copied are split by copying. With this analysis, the portions to be split off from the original JSP file can be appropriately determined in accordance with the split object instruction and automatically split, and it is ensured that each JSP file after split can properly operate. Moreover, the copyable operations are split by copying, thus minimizing portions moved to the JSP files that is newly created by the split.

The analysis by the JSP analysis unit 20 is performed by utilizing the functional feature of this type of application logic including JSP regardless of the runtime engine. Specifically, the analysis is performed based on the dependence related to the JavaBeans and the types of scope. Thus, a significant overhead is not caused.

The processing of the JSP analysis unit 20 will be specifically described.

1. Removal of Dependence Related to Data Obtained from the Execution Environment on the Server Side.

In other words, the dependence related to the variables equally usable from the JSP files after split is removed.

FIG. 4 is a table showing a list of variables (objects) which can be referred to commonly in servlet programs compiled from the split JSP files by using the Apache Jasper JSP™ complier.

Each of the variables (#jspxFactory, pageContext, session, application, config, out) shown in FIG. 4 or classes thereof (javax.servlet.jsp.JspFactory,javax.servlet.jsp.PageContext, javax.servlet.http.HttpSession,javax.servlet.ServletContext, javax.servlet.ServletConfig, javax.servlet.jsp.Jspwriter) can be obtained from the servlet container. Methods thereof have no side effects (effects that the methods do not act or act improperly after split-off, etc.). Therefore, even when a portion including data dependence related to these variables is split in the JSP file, the same action as before the split is ensured. Accordingly, even when the servlet program created from the JSP file to be processed includes the data dependence related to the variables shown in FIG. 4, the JSP analysis unit 20 ignores the dependence and judges the portion to be splittable. Then, the JSP analysis unit 20 reflects a result of the judgment on later-described analysis processing. The table shown in FIG. 4 is held, for example, in the main memory 200 shown in FIG. 1 and referred to by the split execution unit 30.

Such information is obtained by detailed analysis of a source program of the servelet container. However, when a table is prepared as described above and the judgment is mechanically performed, labor required for the analysis can be eliminated and the processing can be efficiently performed.

2. Analysis of Data Dependence Related to Accesses to Objects Encapsulating Logics.

The JSP analysis unit 20 analyzes the data dependence related to accesses to objects encapsulating logics, in other words, the data dependence related to the JavaBeans, and individually judges whether or not the JSP file can be split. The JSP analysis unit 20 then defines the split object in the JSP file such that the JSP files after split as a whole properly perform the same actions as the JSP file before the split. Hereinafter, these actions will be described in detail with reference to flowcharts in FIGS. 5 to 8. In the description below, an original JSP file indicates a JSP file before split and the JSP file remaining after a predetermined operation is cut away based on the split object instruction. A destination JSP file indicates a new JSP file which is cut away from the original JSP file. Among actions of split operations in the JSP file, an action of copying a predetermined operation from the original file and putting the same into the destination JSP file is referred to as copy of the operation. An action of cutting a predetermined operation away from the original file and putting the same into the destination JSP file is referred to as move of the operation.

Figure 5:
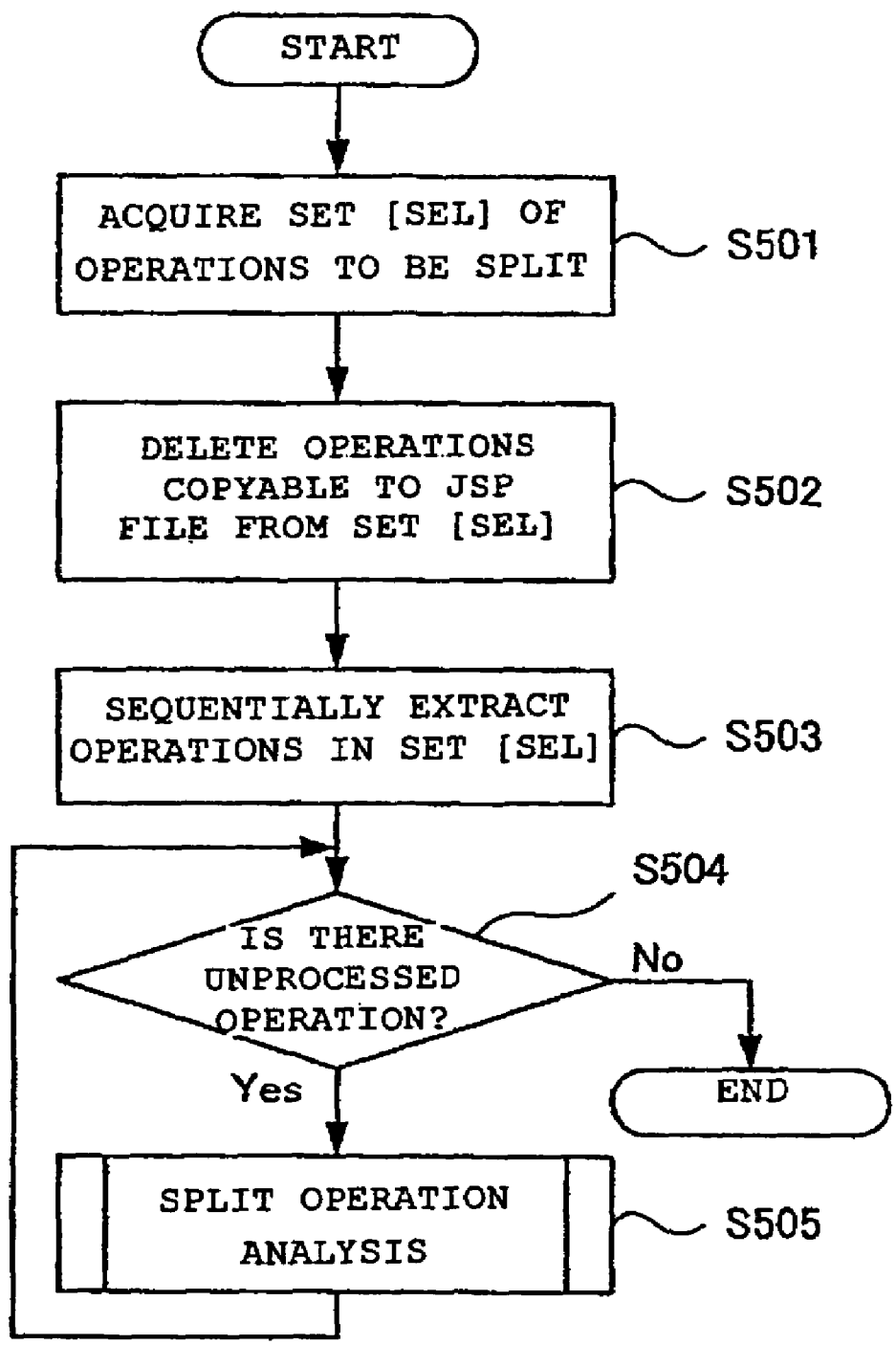
FIG. 5 is a flowchart explaining an entire flow of analysis processing by a JSP analysis unit in the embodiment.

FIG. 5 is a flowchart explaining an entire flow of the analysis processing by the JSP analysis unit 20.

As shown in FIG. 5, the JSP analysis unit 20 reads the JSP file to be processed through the control unit 50 and acquires a [SEL], which is a set of operations to be split off from the original JSP file based on the split object instruction inputted through the user interface control unit 10 (step 501). Subsequently, the JSP analysis unit 20 selects the operations that can be copied from the original JSP file to the destination JSP file among the set [SEL] and deletes the selected operations from the set [SET] (step 502). Herein, the copyable operations are the following two operations.

Declaration of JavaBeans

Definition of values to JavaBeans with page scope

These operations have no side effects in an action of the entire processing by each JSP file after the split even if copied to the destination JSP files. Moreover, as long as the portions depending on these operations are not cut away together, these operations do not affect the entire actions after the split. Accordingly, these operations are excluded from objects in the following analysis. If the portion related to (depending on) the portion determined to be copied is not cut away, the copied portion causes no side effects (does not affect the entire execution). Accordingly, copy of these operations is meaningless. If the excluded operations are necessary for the portion to be cut away and put into the destination JSP file, these operations will be judged as portions to be copied in a later analysis, and the action after the split is properly ensured.

Next, the JSP analysis unit 20 performs a split operation analysis of searching for operations to be split off together with the operations included in the set [SEL] sequentially for each operation in the set [SEL] (steps 503, 504, and 505).

Figure 6:
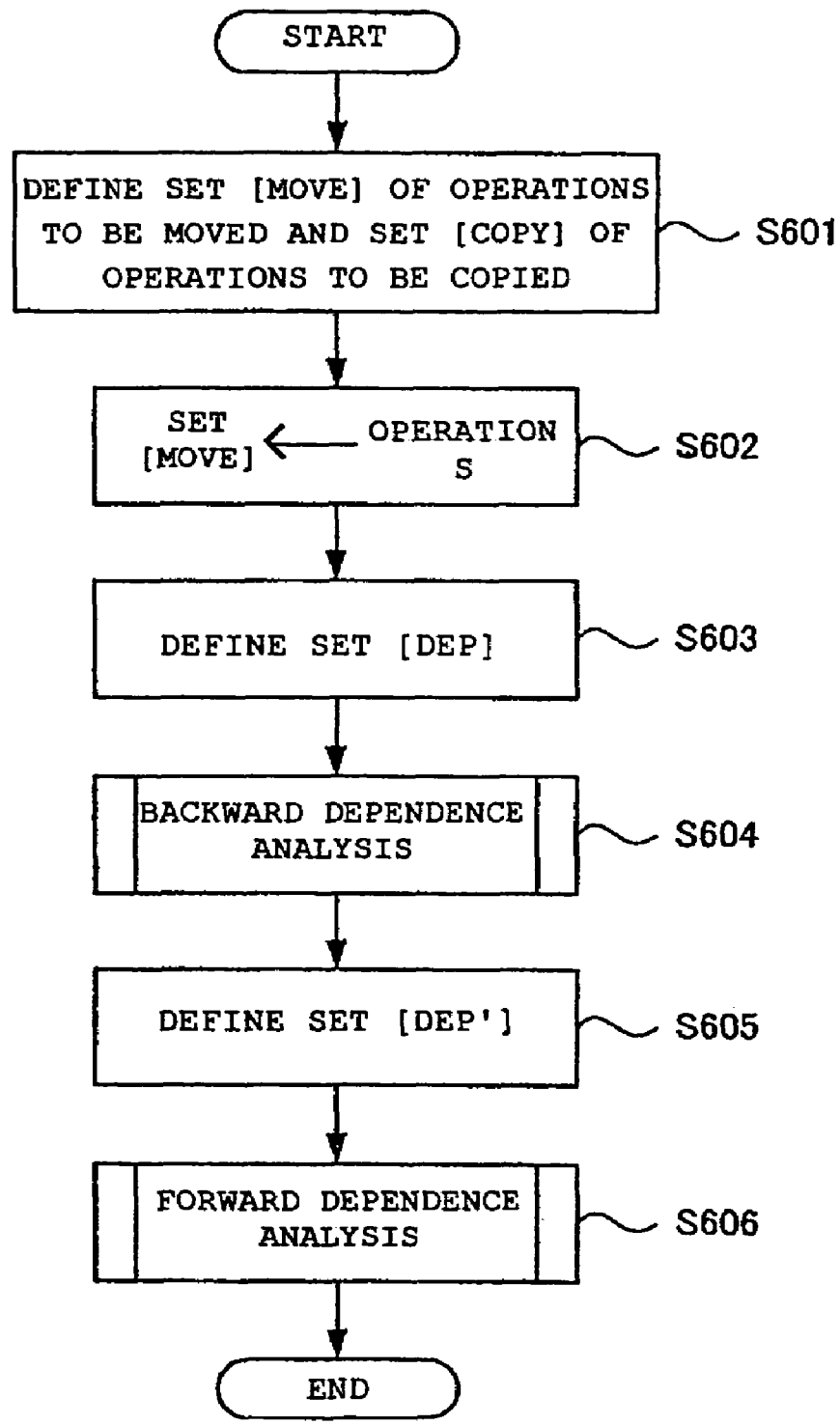
FIG. 6 is a flowchart explaining detailed actions of a split operation analysis shown in FIG. 5.

FIG. 6 is a flowchart explaining detailed actions of the split operation analysis shown in the step 505 of FIG. 5.

As shown in FIG. 6, first, the JSP analysis unit 20 defines a set [MOVE] of operations to be moved from the original JSP file to the destination JSP file and a set [COPY] of operations to be copied from the original JSP file to the destination JSP file (step 601). The operations S for the JavaBeans are selected from the set [SEL] and put into the set [MOVE] one by one (step 602).

Next, among the operations described in the original JSP file, the JSP analysis unit 20 extracts operations D, which are other operations that the operation S depends on and not included in any of the sets [SEL], [MOVE], and [COPY]. The JSP analysis unit 20 defines a set [DEP] of the operations D (step 603). The JSP analysis unit 20 then performs a backward dependence analysis for each operation included in this set [DEP] (step 604).

Furthermore, among the operations described in the original JSP file, the JSP analysis unit 20 extracts operations D', which are other operations depending on the operation S and not included in any of the sets [SEL], [MOVE], and [COPY]. The JSP analysis unit 20 defines a set [DEP'] of the operations D' (step 605). The JSP analysis unit 20 then performs a forward dependence analysis for each operation included in this set [DEP'] (step 606).

Figure 7:
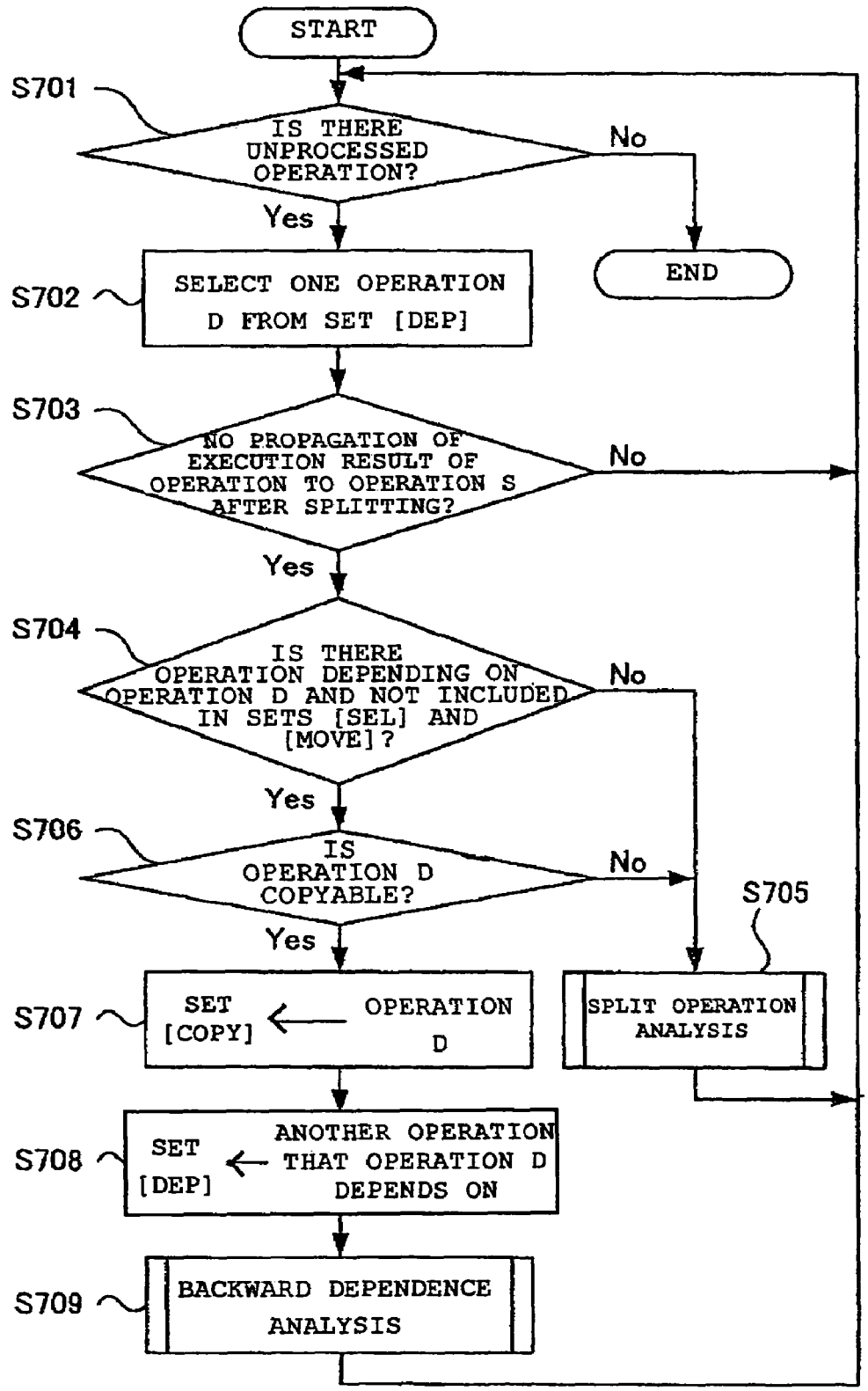
FIG. 7 is a flowchart explaining detailed actions of a backward dependence analysis shown in FIG. 6.

FIG. 7 is a flowchart explaining detailed actions of the backward dependence analysis shown in the step 604 of FIG. 6. As shown in FIG. 7, the operations D are sequentially selected from the set [DEP] one by one, and the following judgment and processing are executed (step 701 and 702).

For the selected operation D, the JSP analysis unit 20 first judges whether the execution result of the operation D is propagated to each operation S after split of the JSP file (S703). Two conditions under which the execution result of a certain operation is propagated to other operation after split of the JSP file are as follows.

Scope of the Bean which is an object of the operation is Application, Session, or Request.

The JSP files after split are executed in the same servlet engine.

When the execution result of the focused operation D is propagated to the operation S after split of the JSP file, it is not necessary that this operation D and the operation S are split off together. Accordingly, the JSP analysis unit 20 returns to the step 701 and focuses on the next unprocessed operation D.

On the other hand, when the execution result of the focused operation D is not propagated to the operation S after split of the JSP file, the JSP analysis unit 20 judges whether there is the operation which depends on the operation D and is not included in the set [SEL] or [MOVE) (step 704). If there is not such an operation, the operation D is only necessary for the operation S. Accordingly, the operation D is determined to be moved together with the operation S. The JSP analysis unit 20 applies the split operation analysis (see FIG. 6) to the operation D determined to be moved (step 705).

On the contrary, if there is the operation which depends on the operation D and is not included in the set [SEL] or [MOVE], the JSP analysis unit 20 then determines whether the operation D can be copied (step 706). When the operation D is can be copied, the JSP analysis unit 20 determines the operation D as the operation to be copied and puts the operation D into the set [COPY] (step 707). The JSP analysis unit 20 puts another operation on which the operation D depends into the set [DEP] as a new operation D (step 708) and recursively applies the backward dependence analysis (step 709).

When the focused operation D can not be copied, the JSP analysis unit 20 determines the operation D as the operation to be moved with the operation S and applies the split operation analysis (see FIG. 6) to the operation D (step 705).

After the above-described processing is performed for all the operations (including the operations added in the step 708) in the set [DEP], the backward dependence analysis is finished (step 701).

When the backward dependence analysis is applied to the operations to be copied, all the operations depending on the operations to be copied become operations to be copied, which is apparent from the feature (no side effects and meaningless when only the copyable operations are moved) in the operations which can be copied. For example, there is no operation that the declaration of Beans depends on. The operation of the definition for Beans depends only on the operations of declaration of Beans. Accordingly, the operation of the definition of Beans can be copied to the destination JSP files.

Figure 8:
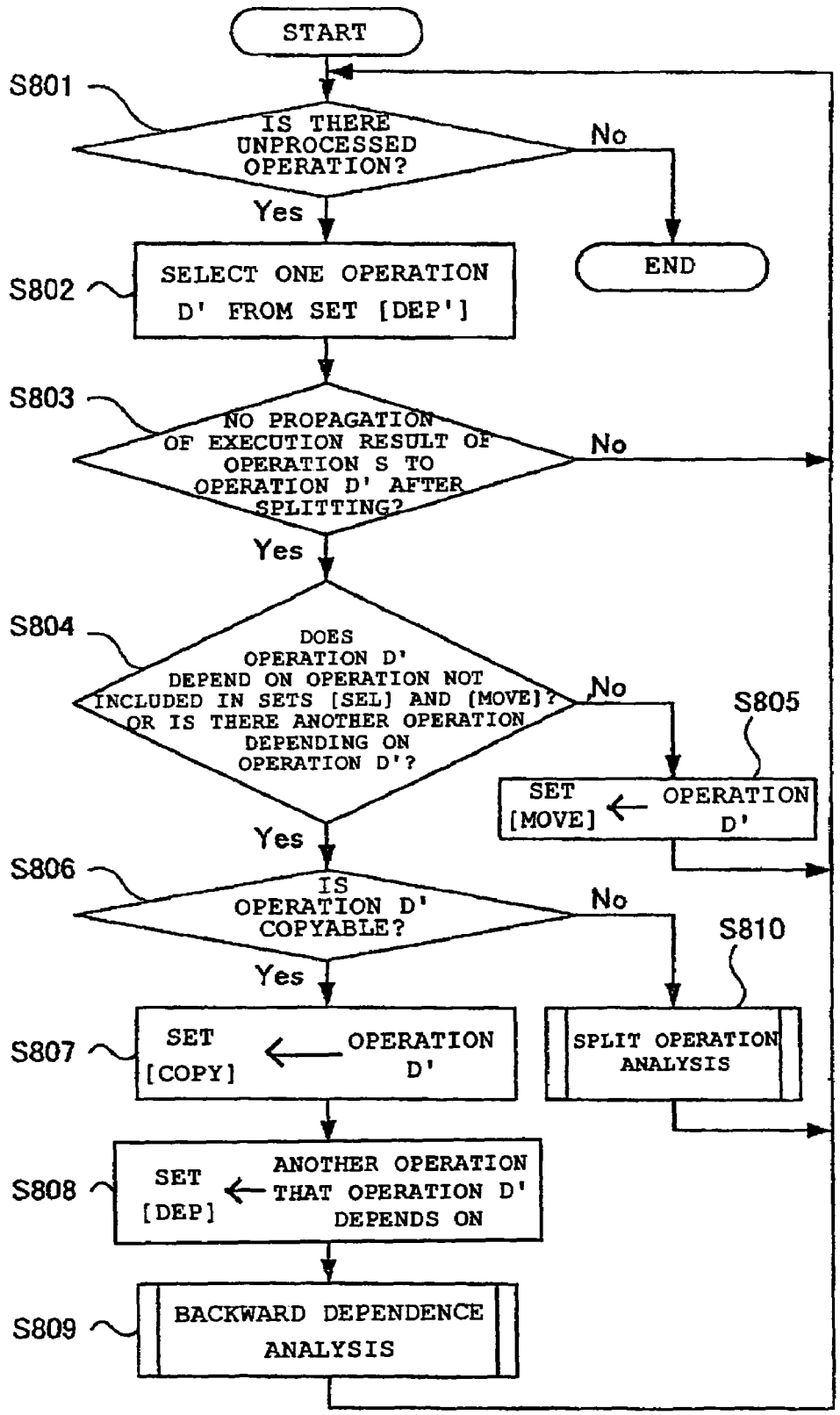
FIG. 8 is a flowchart explaining detailed actions of a forward dependence analysis shown in FIG. 6.

FIG. 8 is a flowchart explaining detailed actions of the forward dependence analysis shown in the step 604. As shown in FIG. 8, the operations D' are sequentially selected from the set [DEP'] one by one, and the following judgment and processing are executed (steps 801 and 802).

For the selected operation D', the JSP analysis unit 20 first determines whether the execution result of each operation S is propagated to the operation D' after split of the JSP file (S803). If the execution result of the operation S is propagated to the operation D', it is not necessary that the operation D' and the operation S are split off together. Accordingly, the JSP analysis unit 20 returns to the step 801 without moving or copying the operation D' and focuses on the next unprocessed operation D'.

On the other hand, for the focused operation D', if the execution result of the operation S is not propagated to the operation D' after split of the JSP file, the JSP analysis unit 20 judges whether the operation D' depends on a certain operation which is not included in any of the sets [SEL] and [MOVE] or whether there is another operation depending on the operation D' (step 804). When all of the operations that the operation D' depends on have been determined to be moved to the destination JSP file and there is no other operations depending on the operation D', the operation D' is determined as the operation to be moved together with the operation S. The JSP analysis unit 20 puts the operation D' into the set [MOVE] (step 805).

When the focused operation D' depends on the predetermined operation that is not included in any of the sets [SEL] and [MOVE] or when there is another operation depending on the operation D', the JSP analysis unit 20 then judges whether the operation D' can be copied (step 806). If the operation D' can be copied, the JSP analysis unit 20 determines the operation D' as the operation to be copied and puts the operation D' into the set [COPY] (step 807), puts another operation that the operation D' depends on into the set [DEP'] as a new operation D' (step 808) and applies the backward dependence analysis (see FIG. 7) (step 809).

If the focused operation D' can not be copied, the JSP analysis unit 20 determines the operation D' as the operation to be moved together with the operation S and applies the split operation analysis (see FIG. 6) to the operation D' (step 810).

After the above-described processing is performed for all the operations (including the operations added in the step 708) in the set [DEP'], the forward dependence analysis is finished (step 801).

Next, working of the embodiment will be described by showing concrete examples of the JSP file and the web page created by the same.

Figure 10:
FIG. 10 is a view showing an example of the web page created from the JSP file of FIG. 9.

FIG. 9 is a view showing an example of the JSP file, and FIG. 10 is a view showing an example of the web page created from the JSP file of FIG. 9. FIGS. 11 and 12 are views showing operations which are split off together with an operation to be split off in the case of specifying the operation to be split off in the JSP file of FIG. 9.

In FIG. 11, among descriptions of the JSP file, an operation 1101 surrounded by a solid line is a portion (in accordance with the split object instruction) selected by a user for split. The user specifies the portion of the operation 1101 in the JSP file by using the input device 300 such as a mouse to make the split object instruction. The JSP file is displayed on the display device 400 by control of the user interface control unit 10.

This selected operation 1101 depends on an operation 1102 surrounded by a dashed line and an operation 1103 surrounded by a chain line. Therefore, as a result of the analysis processing by the JSP analysis unit 20 in the embodiment, the operations 1102 and 1103 are judged to be split off together with split of the operation 1101 and 1102. Among these operations, the operation 1102 (declaration of a Bean, and definition of a value to the Bean with page scope) depends on another portion in the JSP file and can be copied. Accordingly, the operation 1102 is the portion to be copied to the destination JSP file. On the other hand, the operation 1103 is the portion to be moved to the destination JSP file together with the operation 1101.

Based on the judgment result of the JSP analysis unit 20, the user interface control unit 10 can display the operations 1102 and 1103, which are split off with the operation 1101, such that the operations 1102 and 1103 are visually distinct. For example, the operation 1102 to be copied is displayed in red, and the operation 1103 to be moved is displayed in blue. Thus, the user can previously know which and how portions of the JSP file are split before actual execution of split. Thereafter, the user enters the split execution command by using the input device 300 such as a keyboard, thereby the split execution unit 30 actually splits the JSP file.

In FIG. 12, an operation 1201 surrounded by a solid line is a portion (in accordance with the split object instruction) selected by the user for split. An operation 1202 surrounded by a dashed line is a portion to be split off with the operation 1201 and copied to the destination JSP file like the operation 1102 in FIG. 11. An operation 1203 surrounded by a chain line is a portion to be moved together with the operation 1201 to the destination JSP file. Herein, the operation 1202 is the same as the operation 1102 shown in FIG. 11, but the operation 1202 depends on both the operation 1203 and the operation 1103 shown in FIG. 11. Accordingly, the operation 1202 is judged to be copied.

FIGS. 13A and 13B are views showing the actual split of the JSP file based on the split object instruction made as FIG. 12.

The original JSP file (JSP file shown in FIG. 9) main.jsp is split off into a portion (FIG. 13A) remaining after the split and the destination JSP file split1.jsp (FIG. 13B). In the JSP file main.jsp shown in FIG. 13A, an operation <jsp:include src="split1.jsp"/> for calling the JSP file split1.jsp is inserted. Therefore, when the JSP file main.jsp is executed, the JSP file split1.jsp is executed in the execution of the JSP file main.jsp, and a same web page as the one shown in FIG. 10 can be obtained.

Meanwhile, the JSP file split1.jsp becomes an independently executable JSP file. FIG. 14 is a view showing an example of the web page created when the JSP file split1.jsp is independently executed.

Consideration will be given to a case where the split object instruction same as that shown in FIG. 11 is further performed for the JSP file main.jsp after the JSP file shown in FIG. 9 is split as shown in FIG. 13.

FIG. 15 is a view showing a display example of the JSP file in this case. In FIG. 15, an operation 1501 surrounded by a solid line is a portion (in accordance with the split object instruction) selected by the user for split, which is the same as the operation 1101 in FIG. 11. Operations 1502 and 1503 surrounded by chain lines are portions to be split off with split of the operation 1501, which correspond to the operations 1102 and 1103 in FIG. 11, respectively. However, the operation 1502 is different from the operation 1102 in that the operation 1502 is not a portion to be copied to the destination JSP file but a portion to be moved thereto. As described with reference to FIG. 12, since the operation 1102 (=operation 1202) also depends on the portion of the operation 1203 at the time of FIG. 11, the operation 1102 is judged to be a portion to be copied. On the contrary, at the time of FIG. 15, the portion of the operation 1203 of the FIG. 12 is moved to the JSP file split1.jsp and not included in the JSP file main.jsp. Accordingly, the operation 1502 is movable with the operation 1501.

As described above, in this embodiment, the dependence or the scope in the JSP file is individually analyzed and the portions that can be copied are split off by copying. Accordingly, it is ensured that the JSP file after split performs the same actions as before the split. Moreover, it is possible to minimize the portions to be moved to the JSP files that are newly created by the split-off. Consequently, the JSP file can be automatically and properly split.

Since the analysis of the JSP file according to the embodiment is performed based on the functional feature of the JSP regardless of the runtime engine, a significant overhead is not caused.

Furthermore, in the above-described embodiment, the description was given regarding the case where the mechanism of automatically creating the web page in the server is implemented by the JSP, as an example. However, since the ASP or other similar application logics have the similar types of functional features. Thus, when this embodiment is applied to the ASP or other similar application logics, the file can be automatically and properly split by similar analysis and determination.

As described above, according to the present invention, an application logic which implements a mechanism that dynamically creates a web page in a server can be automatically and properly split, thus considerably improving a work efficiency in such processing.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Although the preferred embodiment of the present invention has been described in detail, it should be understood that various changes, substitutions and alternations can be made therein without departing from spirit and scope of the inventions as defined by the appended claims.

What is claimed is:

1. A program editing apparatus for splitting a program file of a processing object, comprising:
    a processor;
    a file storing unit storing a program file of an application logic of a processing object, the application logic being capable of mixedly describing text data, a server side script, and an access to an object encapsulating a logic and converted into an execution program on a server side;
    a user interface control unit accepting an input of a split object instruction which specifies a portion to be split off from the program file;
    an analysis unit determining an accompanying split portion which is split off together with the portion specified by the split object instruction to ensure that a split off portion performs the same action as it would have performed in the program file and that a remaining program file after split performs its remaining one or more actions properly; and a split execution unit splitting off the portion specified by the split object instruction and the accompanying split portion determined in the analysis unit from the program file, wherein the split execution unit creates a split off portion of the program file that is executable independently and a remaining portion of the program file that is the program file without at least the portion to be split off, wherein the analysis unit determines a portion to be copied from the program file before the split to a new program file created by the split and a portion to be cut away from the program file before the split and moved to the new program file, each of the potions being the accompany split portion, wherein the analysis unit copies a predetermined portion of the program file to the new program file created by the split in a case where each of the program files after the split performs its one or more actions properly even if the predetermined portion is copied to the new program file, and a portion other than the predetermined portion is required to be cut away from the program file because the predetermined portion is cut away from the program file, and wherein the analysis unit judges whether a plurality of portions having dependence related to data, if present, to be splittable.

2. The program editing apparatus according to claim 1, wherein the split off portion of the program file is inserted into the remaining portion of the program file as an operation.

3. The program editing apparatus according to claim 1, wherein the portion specified by the split object instruction and the accompanying split portion are imported into the remaining program file as a tag, and when the remaining program file executes, the portion specified by the split object instruction and the accompanying split portion are executed as a different file, and an execution result of the different file is returned to the remaining program file and merged with an execution result of the remaining program file to create a web page.

4. The program editing apparatus according to claim 1, wherein the analysis unit analyzes data dependence related to the access to the object encapsulating the logic based on a functional feature of the application logic regardless of an execution environment of the program file.

5. The program editing apparatus according to claim 1, wherein, when the analysis unit determines an accompanying split portion to be split off, the analysis unit judges a plurality of portions having dependence related to data obtained from an execution environment of the program file to be splittable.

6. The program editing apparatus according to claim 1, wherein the program file to be processed is a server page file.

7. A computer storage device readable by a machine, tangibly embodying a program of instructions executable by the machine for causing a computer to effect the functions of claim 1.

8. A program editing apparatus for splitting a server page file of a processing object, comprising:

display means for displaying a server page file of a processing object;

accepting means for accepting a split object instruction made by specifying a predetermined portion to be split off for the server page file displayed by the display means;

split object determining means for determining a portion to be split off together with the predetermined portion specified by the split object instruction based on the split object instruction made for the server page file to ensure that a split off portion performs the same action as it would have performed in the server page file and that a remaining server page file after split performs its remaining one or more actions properly, wherein the split object determining means creates the split off portion that is executable independently and the remaining sewer page file that is the server page file without at least the portion to be split off; and display control means for displaying the portion to be split off, which is determined by the split object determining means, in a distinct manner, wherein the split object determining means determines a portion to be copied from the server page file before the split to a new sewer page file created by the split and a portion to be cut away from the sewer page file before the split and moved to the new server page file, each of the portions being the accompanying split portion, wherein the split object determining means copies a predetermined portion of the server page file to the new sewer pare file created by the split in a case where each of the sewer page files after the split performs its one or more actions properly even if the predetermined portion is copied to the new server page file, and a portion other than the predetermined portion is required to be cut away from the server page file because the predetermined portion is cut away from the server page file, and wherein the split object determining means judges whether a plurality of portions having dependence related to data, if present, to be splittable.

9. The program editing apparatus according to claim 8, further comprising:

split execution means for executing split of the server page file based on the determination of the split object determining means, wherein the accepting means accepts an input of an execution command for instructing split processing execution to the split execution means, and the display control means displays an execution result of the split execution by the split execution means.

10. A computer storage device readable by a machine, tangibly embodying a program of instructions executable by the machine for causing a computer to effect the functions of claim 8.

11. A program editing method which splits a program file to be processed by using a computer, the program editing method comprising the steps of:

reading the program file to be processed from a predetermined storage device which stores program files of an application logic, the application logic being capable of mixedly describing text data, a server side script, and an access to an object encapsulating a logic and converted into an execution program on a server side;

accepting an input of a split object instruction which specifies a portion to be split off from the program file to be processed;

determining an accompanying split portion which is split off together with the portion specified by the split object instruction to ensure that a split off portion performs the same action as it would have performed in the program file and that a remaining program file after the split performs its remaining one or more actions properly; and splitting off the portion specified by the split object instruction and the accompanying split portion from the program file to create the split off portion that is executable independently and the remaining program file that is the program file without at least the portion to be split off,
wherein the program editing method further includes
determining a portion to be copied from the program file before the split to a new program file created by the split and a portion to be cut away from the program file before the split and moved to the new program file, each of the portions being the accompanying split portion,
copying a predetermined portion of the program file to the new program file created by the split in a case where each of the program files after the split performs its one or more actions properly even if the predetermined portion is copied to the new program file, and a portion other than the predetermined portion is required to be cut away from the program file because the predetermined portion is cut away from the program file, and
judging whether a plurality of portions having dependence related to data, if present, to be splittable.

12. The program editing method according to claim 11, wherein, in the step of determining the accompanying split portion, data dependence related to the access to the object encapsulating the logic is analyzed, and a portion to be copied from the program file to a new program file created by the split and a portion to be cut away from the program file and moved to the new program file are determined based on a result of the analysis.

13. The program editing method according to claim 11, wherein, in the step of determining the accompanying split portion, a plurality of portions having dependence related to data obtained from an execution environment of the program file to be processed are judged to be splittable.

14. An article of manufacture comprising a storage device readable by a machine, tangibly embodying a program of instructions executable by the machine for causing a computer to effect the steps of claim 11.

15. A program storage device readable by a machine, tangibly embodying a program of instructions executable by the machine to perform method steps for program splitting, said method steps comprising the steps of claim 11.

16. A program storage device readable by a machine, tangibly embodying a program of instructions executable by the machine, the program causing a computer to execute the processes of:
reading a program file of a processing object from a predetermined storage device which stores a program file of an application logic, the application logic being capable of mixedly describing text data, a server side script, and an access to an object encapsulating a logic and converted into an execution program on a server side;
accepting an input of a split object instruction which specifies a portion to be split off from the program file;
determining an accompanying split portion which is split off together with the portion specified by the split object instruction to ensure that a split off portion performs the same action as it would have performed in the program file and that a remaining program file after split performs its remaining one or more actions properly; and
splitting off the portion specified by the split object instruction and the accompanying split portion from the program file to create the split off portion that is executable independently and the remaining program file that is the program file without at least the portion to be split off,
wherein the processes further include determining a portion to be copied from the program file before the split to a new program file created by the split and a portion to be cut away from the program file before the split and moved to the new program file, each of the portions being the accompanying split portion,
copying a predetermined portion of the program file to the new program file created by the split in a case where each of the program files after the split performs its one or more actions properly even if the predetermined portion is copied to the new program file, and a portion other than the predetermined portion is required to be cut away from the program file because the predetermined portion is cut away from the program file, and
judging whether a plurality of portions having dependence related to data, if present, to be splittable.

17. The program storage device according to claim 16, wherein the process of determining the accompanying split portion by the program causes the computer to execute the processes of: while focusing sequentially on each operation in a portion specified by the split object instruction, detecting another operation on which the focused operation depends by a backward dependence analysis and putting the detected operation into the accompanying split portion, and while focusing sequentially on each operation in the portion specified in the split object instruction, detecting another operation which depends on the focused operation by a forward dependence analysis and putting the detected operation into the accompanying split portion.

18. The program storage device according to claim 16, wherein the process of determining the accompanying split portion by the program causes the computer to execute the process of judging a plurality of portions having dependence related to data obtained from an execution environment of the program file to be splittable.

19. A program storage device readable by a machine, tangibly embodying a program of instructions executable by the machine, the program causing a computer to function as:
accepting means for accepting a split object instruction made by specifying a predetermined portion to be split off for a server page file of a processing object;
split object determining means for determining a portion to be split off together with the predetermined portion specified by the split object instruction based on the split object instruction made for the server page file to ensure that a split off portion performs the same action as it would have performed in the server page file and that a remaining server page file after split performs its remaining one or more actions properly, wherein the split object determining means creates the split off portion that is executable independently and the remaining server page file that is the server page file without at least the portion to be split off; and
display control means for displaying the server page file and displaying the portion to be split off together with the predetermined portion specified by the split object instruction in a visually distinct manner,
wherein the split object determining means determines a portion to be copied from the server page file before the split to a new server page file created by the split and a portion to be cut away from the server page file before the split and moved to the new server page file, each of the portions being the accompanying split portion,
wherein the split object determining means copies a predetermined portion of the server page file to the new server page file created by the split in a case where each of the server page files after the split performs its one or more actions properly even if the predetermined portion is copied to the new server page file, and a portion other than the predetermined portion is required to be cut away from the server page file because the predetermined portion is cut away from the server page file, and wherein the split object determining means judges whether a plurality of portions having dependence related to data, if present, to be splittable.

20. The program storage device according to claim 19, wherein the function as the split object determining means by the program identifies a variable which can still be used after the split of the server page file among descriptions of the server page file and determines the portion to be split off by removing a dependence related to the variable.

21. The program storage device according to claim 19, wherein the function as the split object determining means by the program identifies objects which can still be referred after the split of the server page file and puts accesses to a plurality of the objects having data dependence to the portion to be split off.

* * * * *